(12) United States Patent
Chen et al.

(10) Patent No.: US 9,189,115 B2
(45) Date of Patent: Nov. 17, 2015

(54) TOUCH MODULE AND TOUCH POSITIONING METHOD THEREOF

(71) Applicant: Wistron Corporation, New Taipei (TW)

(72) Inventors: Shih-Wen Chen, New Taipei (TW);
Yu-Yen Chen, New Taipei (TW);
Po-Liang Huang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 184 days.

(21) Appl. No.: 14/071,617

(22) Filed: Nov. 4, 2013

(65) Prior Publication Data

US 2015/0035788 A1  Feb. 5, 2015

(30) Foreign Application Priority Data

Aug. 2, 2013 (TW) .............................. 102127836 A (51) Int. Cl.
*G06F 3/033* (2013.01)
*G06F 3/044* (2006.01)
*G06F 3/045* (2006.01)

(52) U.S. Cl.
CPC ................ *G06F 3/044* (2013.01); *G06F 3/045* (2013.01)

(58) Field of Classification Search
USPC ......................................... 345/179
See application file for complete search history.

(56) References Cited

U.S. PATENT DOCUMENTS

| | | | |
|---|---|---|---|
| 2001/0000666 A1* | 5/2001 | Wood | G06F 3/03545 345/179 |
| 2010/0039405 A1 | 2/2010 | Chen | |
| 2012/0206330 A1* | 8/2012 | Cao | G06F 3/0383 345/156 |
| 2013/0141399 A1* | 6/2013 | Cho | G06F 1/1626 345/179 |

* cited by examiner

*Primary Examiner* — Roy Rabindranath
(74) *Attorney, Agent, or Firm* — Winston Hsu; Scott Margo (57) ABSTRACT

A touch module includes a touch device, a stylus, and a processing unit. The stylus includes a body, a motor, an angle encoder, and a distance sensor. The angle encoder and the distance sensor are disposed on a rotating shaft of the motor. The distance sensor detects relative distances between itself and first, second, third, and fourth sides of a front frame of the touch device respectively. The processing unit is disposed in the body or the touch device for controlling the rotating shaft to rotate when a mark of the body points to the first side, calculating rotating angles of the rotating shaft and determining whether the rotating shaft makes one rotation according to encoded data of the angle encoder, and calculating four local minimum distances according to relationship of the rotating angles and the relative distances for positioning the stylus on a touch surface of the touch device.

16 Claims, 6 Drawing Sheets

TOUCH MODULE AND TOUCH POSITIONING METHOD THEREOF

BACKGROUND OF THE INVENTION

1. Field of the Invention

The present invention relates to a touch module and a touch positioning method thereof, and more specifically, to a touch module disposing an angle encoder and a distance sensor on a rotating shaft of a motor of a stylus respectively and a touch positioning method thereof.

2. Description of the Prior Art

In general, a conventional touch module usually adopts the design that touch positioning parts are additionally assembled on the touch module to position a touch object (e.g. a stylus) on a touch surface. For example, in an optical touch module, positioning of a touch object could be performed by utilizing an optical sensor additionally assembled on a screen frame to capture images toward a touch surface and to position the touch object on the touch surface by position comparison of the touch object and the screen frame in the captured images. In a capacitive or resistive touch module, positioning of a touch object could be performed after inductive capacitances or resistances are additionally distributed over a touch surface.

However, as mentioned above, since the aforesaid designs need to additionally assemble a touch positioning mechanism with a complicated design on the touch module, it is disadvantageous to the thinning design of the touch module. Thus, how to position a touch object on a touch surface without additionally assemble touch positioning parts on a touch module could be a concern to the touch positioning design of the touch module.

SUMMARY OF THE INVENTION

An objective of the present invention is to provide a touch module disposing an angle encoder and a distance sensor on a rotating shaft of a motor of a stylus respectively and a touch positioning method thereof, to solve the aforesaid problem.

The present invention provides a touch module including a touch device, a stylus, and a processing unit. The touch device has a front frame and a touch surface. The front frame is disposed around the touch surface and has a first side, a second side, a third side, and a fourth side. The first side is opposite to the third side. The second side is opposite to the fourth side. The stylus is coupled to the touch device in a wireless or wired manner. The stylus includes a body, a motor, an angle encoder, and a distance sensor. The body has a mark formed thereon. The motor is disposed in the body and has a rotating shaft. The angle encoder is disposed on the rotating shaft for generating encoded data with rotation of the rotating shaft. The distance sensor is disposed on the rotating shaft to rotate cooperatively with the rotating shaft, for detecting a plurality of relative distances between itself and the first side, the second side, the third side, and the fourth side of the front frame respectively during the rotating shaft makes one rotation. The processing unit is disposed in the body or the touch device for controlling the motor to rotate the rotating shaft when the mark of the body points to the first side, calculating a plurality of rotating angles of the rotating shaft according to the encoded data, determining whether the rotating shaft makes one rotation according to the encoded data, and calculating four local minimum distances according to relationship of the plurality of rotating angles and the plurality of relative distances. The touch device positions the stylus on the touch surface according to the four local minimum distances calculated by the processing unit. The four local minimum distances are equal to a first minimum distance between the distance sensor and the first side, a second minimum distance between the distance sensor and the second side, a third minimum distance between the distance sensor and the third side, and a fourth minimum distance between the distance sensor and the fourth side respectively.

According to the claimed invention, the processing unit is further used for setting one of the relative distances as one of the four local minimum distances when determining that the one of the relative distances is less than a previous relative distance and a next relative distance.

According to the claimed invention, the processing unit is further used for calculating a first ratio of the first local minimum distance to a sum of the first local minimum distance and the third local minimum distance and calculating a second ratio of the second local minimum distance to a sum of the second local minimum distance and the fourth local minimum distance according to the four local minimum distances, and the touch device positions the stylus on the touch surface according to the first ratio and the second ratio.

According to the claimed invention, the processing unit is disposed in the body and coupled to the motor, the angle encoder, and the distance sensor. The stylus further includes a first transmitting unit. The touch device includes a second transmitting unit. The first transmitting unit is used for transmitting the first ratio and the second ratio to the second transmitting unit in a wireless or wired manner. The touch device positions the stylus on the touch surface according to the first ratio and the second ratio received by the second transmitting unit.

According to the claimed invention, the processing unit is further used for actuating the motor to rotate the rotating shaft by an offset angle in an opposite direction in advance before the rotating shaft starts to rotate, so as to make a detection direction of the distance sensor form the offset angle cooperatively with an indication direction of the mark.

According to the claimed invention, the stylus further includes a switch coupled to the processing unit, and the processing unit is further used for determining whether to control the motor to rotate the rotating shaft according to whether the switch is on or not.

According to the claimed invention, the processing unit is disposed in the touch device. The stylus further includes a first transmitting unit. The touch device includes a second transmitting unit. The processing unit is further used for receiving the encoded data and the plurality of relative distances transmitted from the first transmitting unit via the second transmitting unit in a wireless or wired manner.

According to the claimed invention, the angle encoder is an optical encoder, a mechanical encoder, or a sine encoder.

According to the claimed invention, the distance encoder is an infrared distance sensor or an ultrasonic distance sensor.

According to the claimed invention, the motor is a stepper motor.

The present invention further provides a touch positioning method for positioning a stylus on a touch device. A mark is formed on the stylus. The touch device has a touch surface and a front frame. The front frame is disposed around the touch surface and has a first side, a second side, a third side, and a fourth side. The first side is opposite to the third side. The second side is opposite to the fourth side. The stylus includes a motor, an angle encoder, and a distance sensor. The touch positioning method includes the mark of the stylus pointing to the first side of the front frame, a processing unit actuating the motor to rotate the rotating shaft, the angle encoder generating encoded data with rotation of the rotating shaft, the processing unit calculating a plurality of rotating angles of the rotating shaft according to the encoded data generated by the angel encoder, the distance sensor detecting a plurality of relative distances between itself and the first side, the second side, the third side, and the fourth side of the front frame respectively during the rotating shaft makes one rotation, the processing unit determining whether the rotating shaft makes one rotation according to the encoded data generated by the angle encoder, the processing unit calculating four local minimum distances according to relationship of the plurality of rotating angles and the plurality of relative distances, and the touch device positioning the stylus on the touch surface according to the four local minimum distances. The four local minimum distances are equal to a first minimum distance between the distance sensor and the first side, a second minimum distance between the distance sensor and the second side, a third minimum distance between the distance sensor and the third side, and a fourth minimum distance between the distance sensor and the fourth side respectively.

In summary, via the design that the angle encoder and the distance sensor are disposed on the rotating shaft of the motor for calculating the rotating angles of the rotating shaft and detecting the relative distances between the distance sensor and the front frame respectively, the present invention could calculate the four local minimum distances according to the relationship of the rotating angles and the relative distances, so that the touch device could position the stylus on the touch surface according to the four local minimum distances. In such a manner, the present invention could perform the touch positioning process without additionally assembling touch positioning parts on the touch module, so as to efficiently solve the prior art problem that the touch module needs a touch positioning mechanism with a complicated design to be assembled thereon for positioning a touch object, as well as be advantageous to the thinning design of the touch module.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
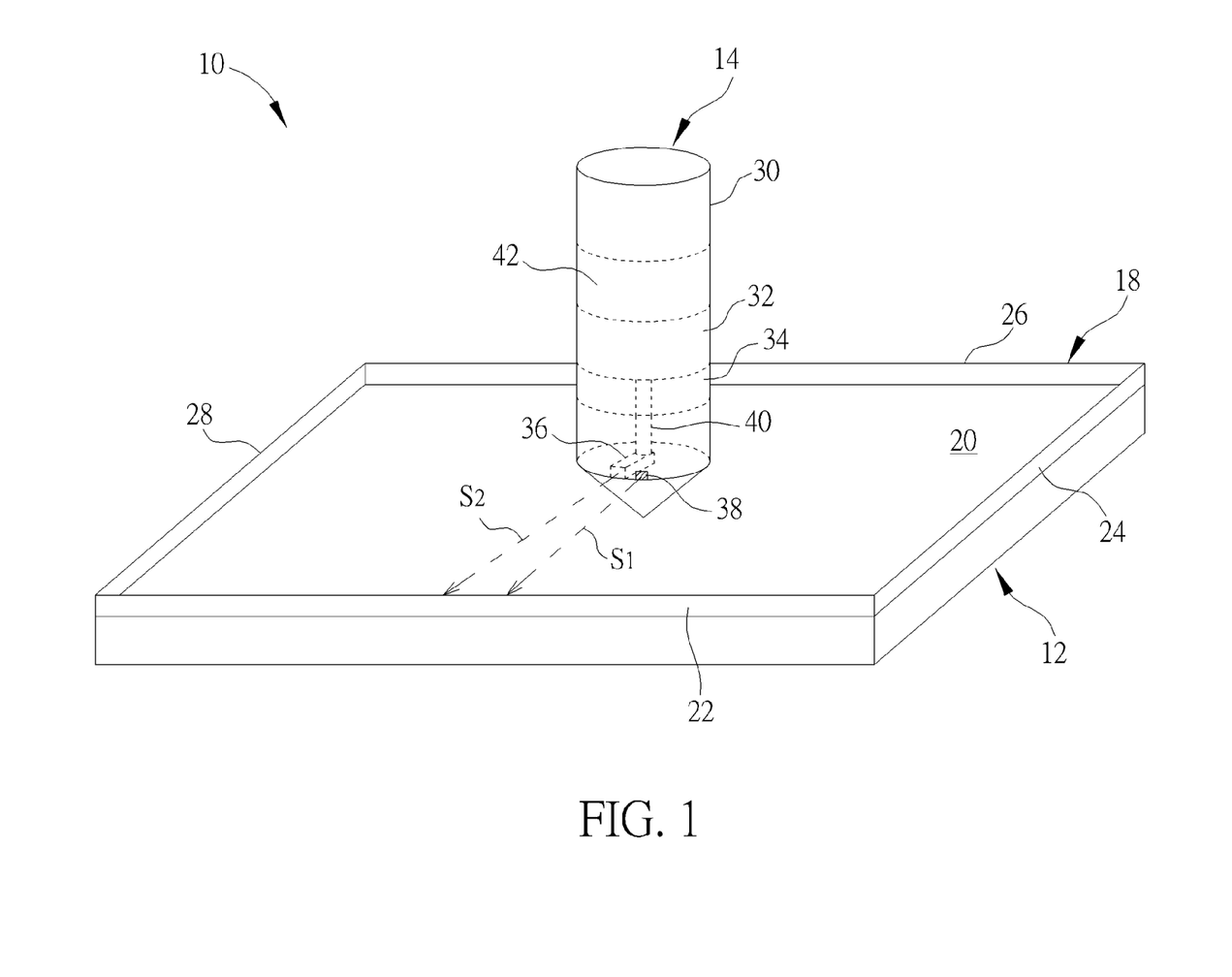
FIG. 1 is a diagram of a touch module according to an embodiment of the present invention.
Figure 2:
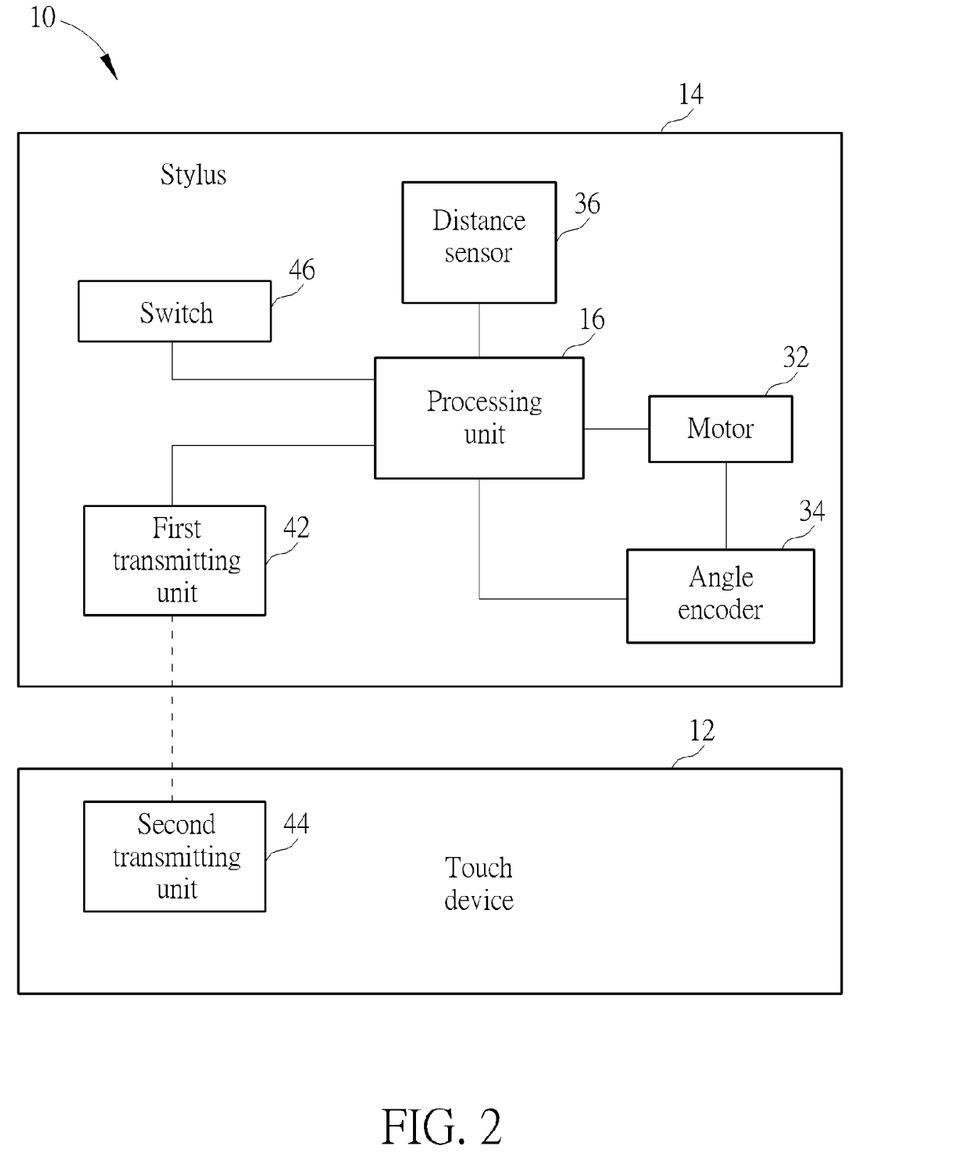
FIG. 2 is a functional block diagram of the touch module in FIG. 1.

Please refer to FIG. 1 and FIG. 2. FIG. 1 is a diagram of a touch module 10 according to an embodiment of the present invention. FIG. 2 is a functional block diagram of the touch module 10 in FIG. 1. As shown in FIG. 1 and FIG. 2, the touch module 10 includes a touch device 12, a stylus 14, and a processing unit 16. For clearly showing the design of the stylus 14, the stylus 14 is depicted in an enlarged manner. The touch device 12 has a front frame 18 and a touch surface 20. The front frame 18 is disposed around the touch surface 20 and has a first side 22, a second side 24, a third side 26, and a fourth side 28. The first side 22 is opposite to the third side 26. The second side 24 is opposite to the fourth side 28. The stylus 14 includes a body 30, a motor 32, an angle encoder 34, and a distance sensor 36. A mark 38 is formed on the body 30 for helping a user perform the positioning operation of the stylus 14. The motor 32 is disposed in the body 30 and has a rotating shaft 40. The motor 32 could be preferably a stepper motor, but not limited thereto.

As shown in FIG. 2, the angle encoder 34 and the distance sensor 36 are disposed on the rotating shaft 40 respectively for rotating together with rotation of the rotating shaft 40. The angle encoder 34 is used for generating encoded data corresponding to the rotating angles of the rotating shaft 40 with rotation of the rotating shaft 40. The distance sensor 36 is used for detecting a plurality of relative distances between itself and the first side 22, the second side 24, the third side 26, and the fourth side 28 of the front frame 18 respectively. The angle encoder 34 could preferably an optical encoder, a mechanical encoder, or a sine encoder. The distance encoder 36 could be an infrared distance sensor or an ultrasonic distance sensor.

As for the related description for the detecting principles of the angle encoder 34 and the distance sensor 36, it is commonly seen in the prior art. For example, if the angle encoder 34 is an optical encoder, the angle encoder 34 could adopt the design that a disk having a plurality of transparent and opaque regions formed thereon is disposed on the rotating shaft 40 of the motor 32 and a light source and a light sensor are disposed at two sides of the disk respectively. In such a manner, the angle encoder 34 could generate corresponding encoded data according to a detection result of whether the light sensor detects light passing through the transparent regions during the disk rotates with rotation of the rotating shaft 40. Accordingly, the processing unit 16 could calculate the rotating angles of the rotating shaft 40 corresponding to the encoded data by decoding the encoded data via a corresponding lookup table. If the distance sensor 36 is an infrared distance sensor, the distance sensor 36 could utilize an infrared transceiver to emit infrared light to a side of the front frame 18 and receive the reflected infrared light, and then to calculate the distance between itself and the front frame 18 by a triangulation method.

In this embodiment, the stylus 14 is coupled to the touch device 12 in a wireless manner, but not limited thereto, meaning that the stylus 14 could be coupled to the touch device 12 in a wired manner (e.g. via a data transmitting cable). The stylus 14 could further include a first transmitting unit 42. The touch device 12 could include a second transmitting unit 44. The first transmitting unit 42 and the second transmitting unit 44 could be both a wireless transmission device (e.g. a Bluetooth device) for establishing wireless transmission between the stylus 14 and the touch device 12. Furthermore, as shown in FIG. 2, the stylus 14 could further include a switch 46. The switch 46 is coupled to the processing unit 16. Accordingly, the processing unit 16 could be used for determining whether to control the motor 32 to rotate the rotating shaft 40 according to whether the switch 46 is on or not.

In this embodiment, the processing unit 16 is disposed in the body 30 and coupled to the motor 32, the angle encoder 34, and the distance sensor 36. The processing unit 16 is used for controlling the motor 32 to rotate the rotating shaft 40 when the mark 38 of the body 30 points to the first side 22 of the front frame 18, calculating a plurality of rotating angles of the rotating shaft 40 and determining whether the rotating shaft 40 makes one rotation according to encoded data generated by the angle encoder 34, and calculating four local minimum distances according to relationship of the plurality of rotating angles of the rotating shaft 40 and the plurality of relative distances detected by the distance sensor 36. In such a manner, the touch device 12 could position the stylus 14 on the touch surface 20 according to the four local minimum distances calculated by the processing unit 16.

Figure 3:
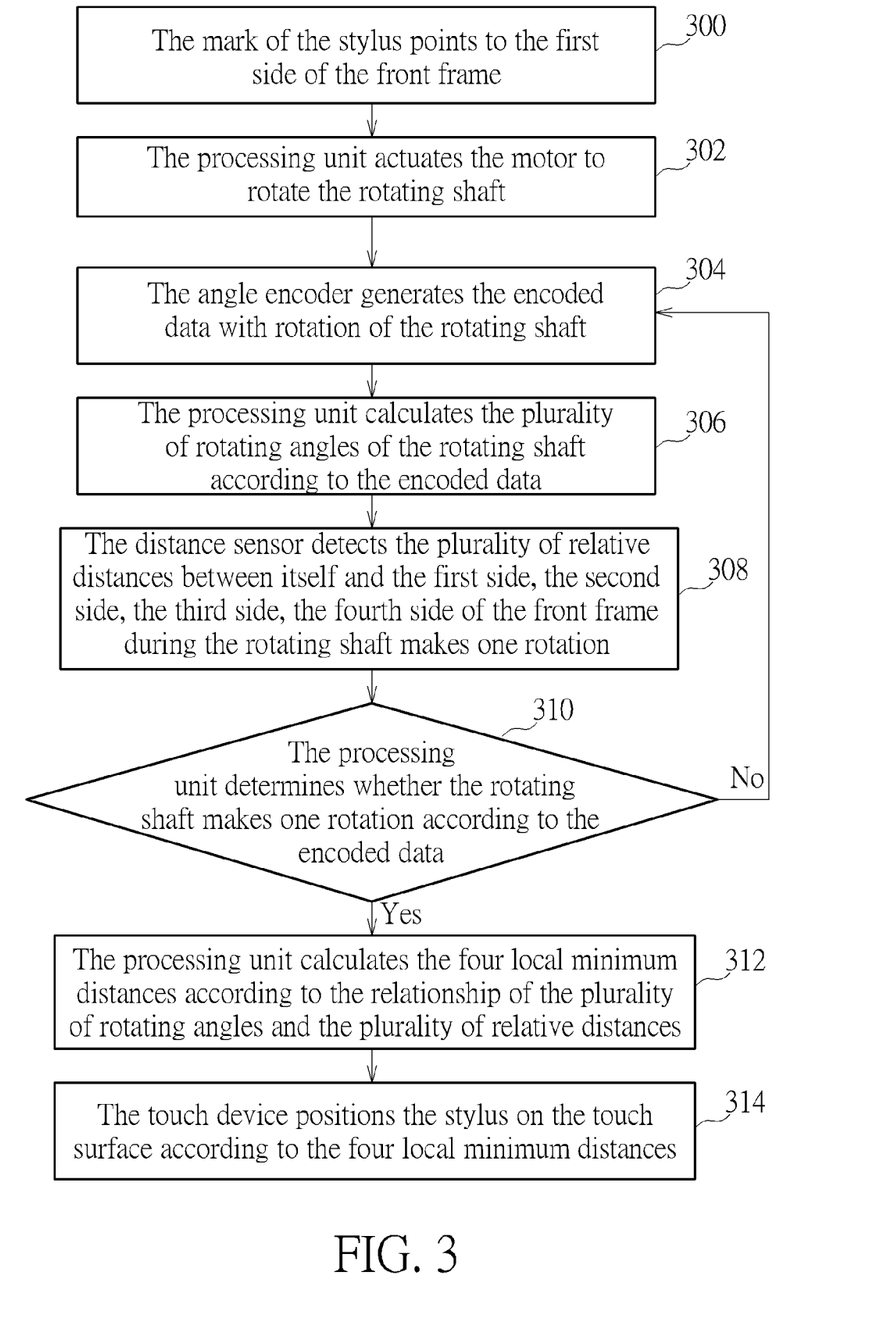
FIG. 3 is a flowchart of a touch positioning method for positioning a stylus on a touch device according to an embodiment of the present invention.
Figure 4:
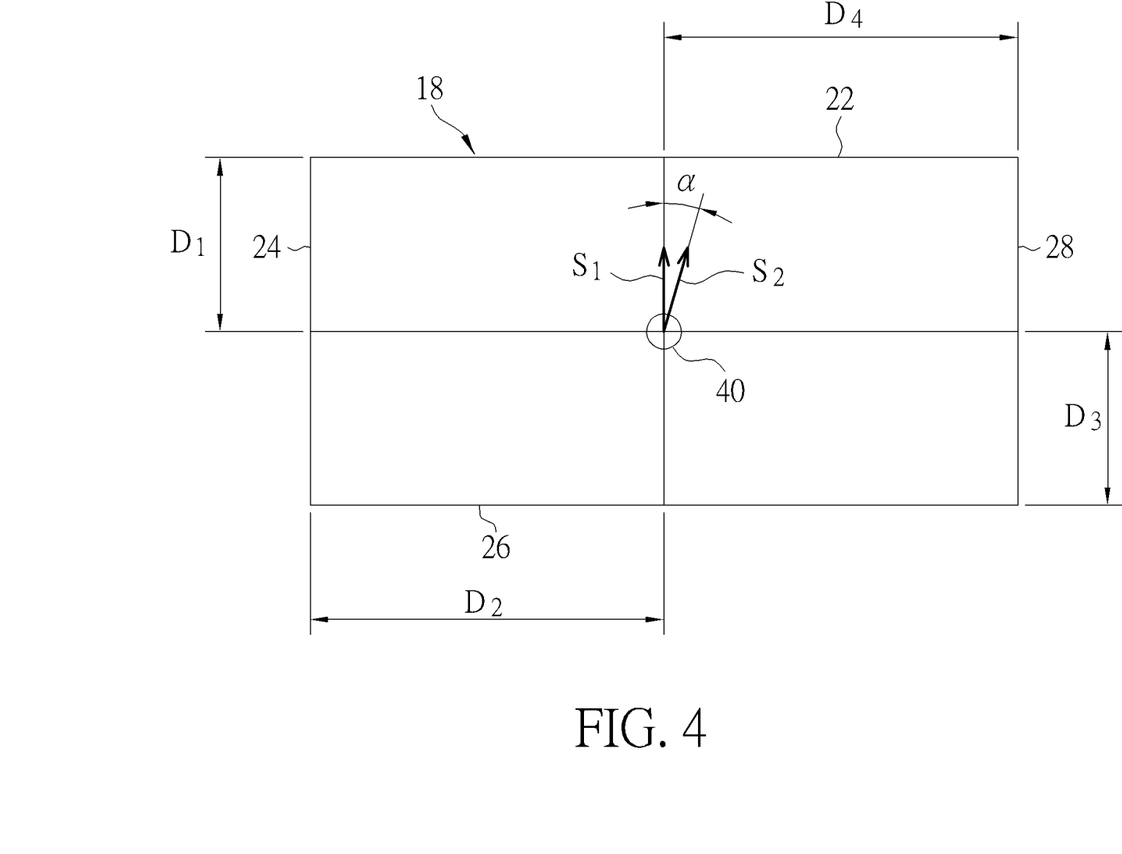
FIG. 4 is a top view of a rotating shaft and a front frame in FIG. 1 when the rotating shaft has not rotated yet.
Figure 5:
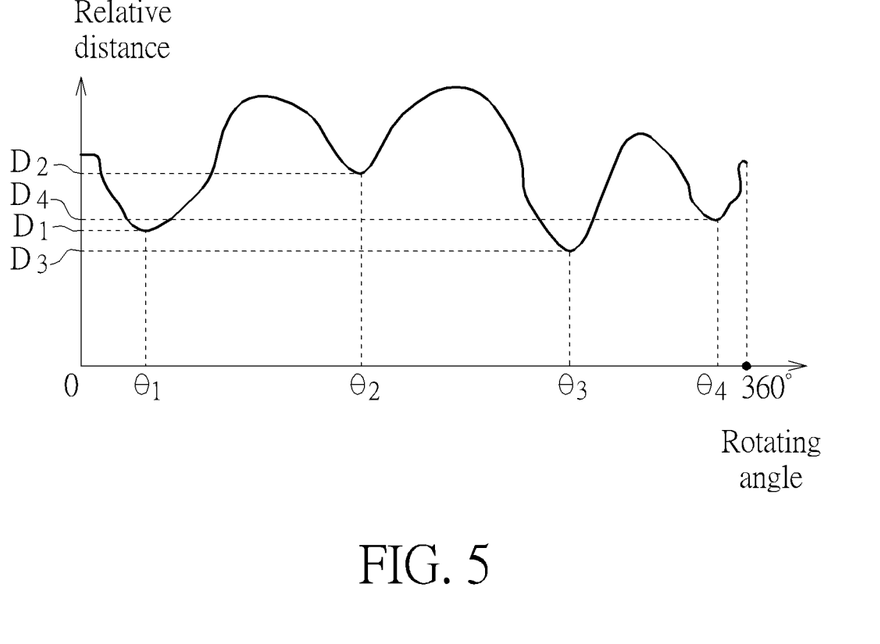
FIG. 5 is a diagram showing relationship of rotating angles of the rotating shaft and relative distances detected by a distance sensor in FIG. 1 during the rotating shaft makes one rotation.

More detailed description for the touch positioning method of the present invention is provided as follows. Please refer to FIG. 1, FIG. 2, FIG. 3, FIG. 4, and FIG. 5. FIG. 3 is a flowchart of a touch positioning method for positioning the stylus 14 on the touch device 12 according to an embodiment of the present invention. FIG. 4 is a top view of the rotating shaft 40 and the front frame 18 in FIG. 1 when the rotating shaft 40 has not rotated yet. FIG. 5 is a diagram showing the relationship of the rotating angles of the rotating shaft 40 and the relative distances detected by the distance sensor 36 in FIG. 1 during the rotating shaft 40 makes one rotation. The touch positioning method includes the following steps.

Step 300: The mark 38 of the stylus 14 points to the first side 22 of the front frame 18;

Step 302: The processing unit 16 actuates the motor 32 to rotate the rotating shaft 40;

Step 304: The angle encoder 34 generates the encoded data with rotation of the rotating shaft 40;

Step 306: The processing unit 16 calculates the plurality of rotating angles of the rotating shaft 40 according to the encoded data;

Step 308: The distance sensor 36 detects the plurality of relative distances between itself and the front frame 18 during the rotating shaft 40 makes one rotation;

Step 310: The processing unit 16 determines whether the rotating shaft 40 makes one rotation according to the encoded data; if so, go to Step 312; if not, go back to Step 304;

Step 312: The processing unit 16 calculates the four local minimum distances according to the relationship of the plurality of rotating angles and the plurality of relative distances;

Step 314: The touch device 12 positions the stylus 14 on the touch surface 20 according to the four local minimum distances.

As mentioned in Step 300, when a user wants to utilize the stylus 14 to perform the touch operations of the touch device 12, the user needs to rotate the stylus 14 to make the mark 38 of the body 30 point to the first side 22 of the front frame 18. That is, the user needs to adjust an indication direction $S_1$ of the mark 38 to point to the first side 22 of the front frame 18 (as shown in FIG. 1 and FIG. 4). To be noted, in this embodiment, before the motor 32 drives the rotating shaft 40 to rotate, the processing unit 16 could actuate the motor 32 to rotate the rotating shaft 40 by an offset angle α in an opposite direction in advance (as shown in FIG. 4), so as to make a detection direction $S_2$ of the distance sensor 36 form the offset angle α (preferably 0~45°) cooperatively with the indication direction $S_1$ of the mark 38. Accordingly, the present invention could make sure that the distance sensor 36 could detect the local minimum distance between itself and the first side 22 first.

After the indication direction $S_1$ of the mark 38 is rotated to a position as shown in FIG. 1 and FIG. 4 on the touch surface 20, the user could turn on the switch 46 so that the processing unit 16 could correspondingly actuate the motor 32 to rotate the rotating shaft 40 (Step 302). Subsequently, during rotation of the rotating shaft 40, the angle encoder 34 could generate the encoded data corresponding to the rotating angles of the rotating shaft 40 (Step 304) and then could transmit the encoded data to the processing unit 16. Subsequently, the processing unit 16 could calculate the plurality of rotating angles of the rotating angle 40 according to the encoded data by a table lookup method or other decoding method. At this time, with rotation of the rotating shaft 40, the distance sensor 36 could detect the plurality of relative distances between itself and the first side 22, the second side 24, the third side 26, and the fourth side 28 of the front frame 18 respectively (Step 308) and then could transmit the plurality of relative distances to the processing unit 16. Accordingly, the process unit 16 could establish the relationship of the rotating angles of the rotating shaft 40 and the relative distances between the distance sensor 36 and the front frame 18.

During the aforesaid process, the processing unit 16 could further determine whether the rotating shaft 40 makes one rotation (Step 310). To be more specific, if the processing unit 16 has not received the same encoded data yet, the processing unit 16 could determine that the rotating shaft 40 has not rotated one rotation yet. In this condition, the touch module 10 could continue performing the aforesaid steps of establishing the relationship of the rotating angles and the relative distances (i.e. Steps 304~308). On the contrary, once the processing unit 16 receives the same encoded data, the processing unit 16 could determine that the rotating shaft 40 has rotated one rotation, meaning that the processing unit 16 has established the relationship of the rotating angles and the relative distances corresponding to one rotation of the rotating shaft 40 (as shown in FIG. 5).

After the processing unit 16 has established the relationship of the rotating angles and the relative distances corresponding to one rotation of the rotating shaft 40, the processing unit 16 could calculate the four local minimum distances according to the relationship of the rotating angles and the relative distances (Step 312). The four local minimum distances could be equal to a first minimum distance $D_1$ between the distance sensor 36 and the first side 22, a second minimum distance $D_2$ between the distance sensor 36 and the second side 24, a third minimum distance $D_3$ between the distance sensor 36 and the third side 26, and a fourth minimum distance $D_4$ between the distance sensor 36 and the fourth side 28 respectively (as shown in FIG. 4). As for the calculation method for the aforesaid local minimum distances, it could adopt a conventional local minimum algorithm in the prior art. For example, in this embodiment, when the processing unit 16 determines that one of the relative distances is less than a previous relative distance and a next relative distance, meaning that this relative distance is located at one of the wave trough positions in FIG. 5, the processing unit 16 could set this relative distance as one of the four local minimum distances. Accordingly, the four local minimum distances could be calculated. To be noted, the processing unit 16 could also adopt other local minimum calculation method. For example, when the detection direction $S_2$ is perpendicular to the sides (i.e. the first side 22, the second side 24, the third side 26, and the fourth side 28) of the front frame 18 sequentially, the processing unit 16 could obtain the corresponding rotating angles $\theta_1$, $\theta_2$, $\theta_3$, and $\theta_4$, and then could obtain the four local minimum distances (i.e. the first minimum distance $D_1$, the second minimum distance $D_2$, the third minimum distance $D_3$, and the fourth minimum distance $D_4$) by looking up the relationship of the rotating angles and the relative distance as shown in FIG. 5.

Finally, when the processing unit 16 calculates the four local minimum distances, the touch device 12 could position the stylus 14 on the touch surface 20 according to the four local minimum distances (Step 314). To be more specific, in this embodiment, the processing unit 16 could calculate a first ratio of the first local minimum distance $D_1$ to a sum of the first local minimum distance $D_1$ and the third local minimum distance $D_3$ and a second ratio of the second local minimum distance $D_2$ to a sum of the second local minimum distance $D_2$ and the fourth local minimum distance $D_4$ according to the four local minimum distances, and then transmit the first ratio and the second ratio to the touch device 12 via wireless transmission of the first transmitting unit 42 and the second transmitting unit 44. In such a manner, the touch device 12 could calculate the ratio relationship of the touch position of the stylus 14 relative to the touch surface 20 according to the first ratio and the second ratio for positioning the stylus 14 on the touch surface 20, so as to allow the touch module 10 to perform the subsequent touch operations (e.g. selecting an icon).

Figure 6:
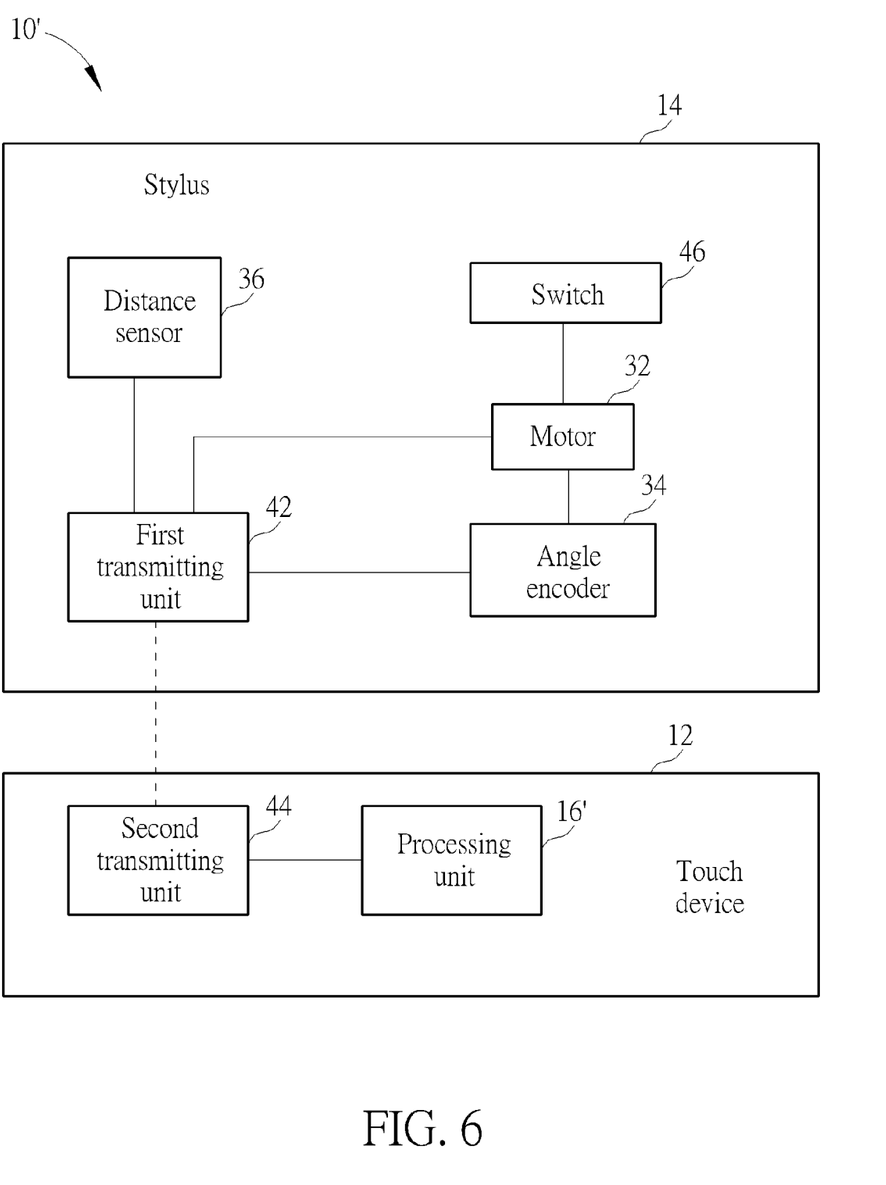
FIG. 6 is a functional block diagram of a touch module according to another embodiment of the present invention.

It should be mentioned that the processing unit is not limited to be disposed in the body of the stylus. That is, in another embodiment, the processing unit could be disposed in the touch device. For example, please refer to FIG. 6, which is a functional block diagram of a touch module 10' according to another embodiment of the present invention. Components both mentioned in FIG. 6 and the aforesaid embodiment represent components with similar functions or structures, and the related description is omitted herein. In this embodiment, as shown in FIG. 6, the switch 46 is directly coupled to the motor 32 for the user to control rotation of the rotating shaft 40, and the touch module 10' includes the touch device 12, the stylus 14, and a processing unit 16'. The processing unit 16' is disposed in the touch device 12. The processing unit 16' is used for receiving the encoded data and the plurality of relative distances transmitted from the first transmitting unit 42 via the second transmitting unit 44 in a wireless manner, so as to calculate the first ratio and the second ratio. The touch device 12 is used for positioning the stylus 14 on the touch surface 20 according to the first ratio and the second ratio calculated by the processing unit 16'. In other words, in this embodiment, the stylus 14 could only have the data transmission function since there is no processing unit disposed thereon, so as to simplify the design of the stylus 14.

In summary, via the design that the angle encoder and the distance sensor are disposed on the rotating shaft of the motor for calculating the rotating angles of the rotating shaft and detecting the relative distances between the distance sensor and the front frame respectively, the present invention could calculate the four local minimum distances according to the relationship of the rotating angles and the relative distances, so that the touch device could position the stylus on the touch surface according to the four local minimum distances. In such a manner, the present invention could perform the touch positioning process without additionally assembling touch positioning parts on the touch module, so as to efficiently solve the prior art problem that the touch module needs a touch positioning mechanism with a complicated design to be assembled thereon for positioning a touch object, as well as be advantageous to the thinning design of the touch module.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch module comprising:
    a touch device having a front frame and a touch surface, the front frame being disposed around the touch surface and having a first side, a second side, a third side, and a fourth side, the first side being opposite to the third side, the second side being opposite to the fourth side;
    a stylus coupled to the touch device in a wireless or wired manner, the stylus comprising:
        a body having a mark formed thereon;
        a motor disposed in the body and having a rotating shaft;
        an angle encoder disposed on the rotating shaft for generating encoded data with rotation of the rotating shaft; and
        a distance sensor disposed on the rotating shaft to rotate cooperatively with the rotating shaft, for detecting a plurality of relative distances between itself and the first side, the second side, the third side, and the fourth side of the front frame respectively during the rotating shaft makes one rotation; and
    a processing unit disposed in the body or the touch device for controlling the motor to rotate the rotating shaft when the mark of the body points to the first side, calculating a plurality of rotating angles of the rotating shaft according to the encoded data, determining whether the rotating shaft makes one rotation according to the encoded data, and calculating four local minimum distances according to relationship of the plurality of rotating angles and the plurality of relative distances;
    wherein the touch device positions the stylus on the touch surface according to the four local minimum distances calculated by the processing unit, and the four local minimum distances are equal to a first minimum distance between the distance sensor and the first side, a second minimum distance between the distance sensor and the second side, a third minimum distance between the distance sensor and the third side, and a fourth minimum distance between the distance sensor and the fourth side respectively.

2. The touch module of claim 1, wherein the processing unit is further used for setting one of the relative distances as one of the four local minimum distances when determining that the one of the relative distances is less than a previous relative distance and a next relative distance.

3. The touch module of claim 2, wherein the processing unit is further used for calculating a first ratio of the first local minimum distance to a sum of the first local minimum distance and the third local minimum distance and calculating a second ratio of the second local minimum distance to a sum of the second local minimum distance and the fourth local minimum distance according to the four local minimum distances, and the touch device positions the stylus on the touch surface according to the first ratio and the second ratio.

4. The touch module of claim 3, wherein the processing unit is disposed in the body and coupled to the motor, the angle encoder, and the distance sensor, the stylus further comprises a first transmitting unit, the touch device comprises a second transmitting unit, the first transmitting unit is used for transmitting the first ratio and the second ratio to the second transmitting unit in a wireless or wired manner, and the touch device positions the stylus on the touch surface according to the first ratio and the second ratio received by the second transmitting unit.

5. The touch module of claim 4, wherein the processing unit is further used for actuating the motor to rotate the rotating shaft by an offset angle in an opposite direction in advance before the rotating shaft starts to rotate, so as to make a detection direction of the distance sensor form the offset angle cooperatively with an indication direction of the mark.

6. The touch module of claim 5, wherein the stylus further comprises a switch coupled to the processing unit, and the processing unit is further used for determining whether to control the motor to rotate the rotating shaft according to whether the switch is on or not.

7. The touch module of claim 3, wherein the processing unit is disposed in the touch device, the stylus further comprises a first transmitting unit, the touch device comprises a second transmitting unit, and the processing unit is further used for receiving the encoded data and the plurality of relative distances transmitted from the first transmitting unit via the second transmitting unit in a wireless or wired manner.

8. The touch module of claim 7, wherein the processing unit is further used for actuating the motor to rotate the rotating shaft by an offset angle in an opposite direction in advance before the rotating shaft starts to rotate, so as to make a detection direction of the distance sensor form the offset angle cooperatively with an indication direction of the mark.

9. The touch module of claim 8, wherein the stylus further comprises a switch coupled to the processing unit, and the processing unit is further used for determining whether to control the motor to rotate the rotating shaft according to whether the switch is on or not.

10. The touch module of claim 1, wherein the angle encoder is an optical encoder, a mechanical encoder, or a sine encoder.

11. The touch module of claim 1, wherein the distance encoder is an infrared distance sensor or an ultrasonic distance sensor.

12. The touch module of claim 1, wherein the motor is a stepper motor.

13. A touch positioning method for positioning a stylus on a touch device, a mark being formed on the stylus, the touch device having a touch surface and a front frame, the front frame being disposed around the touch surface and having a first side, a second side, a third side, and a fourth side, the first side being opposite to the third side, the second side being opposite to the fourth side, the stylus comprising a motor, an angle encoder, and a distance sensor, the touch positioning method comprising:
the mark of the stylus pointing to the first side of the front frame;
a processing unit actuating the motor to rotate the rotating shaft;
the angle encoder generating encoded data with rotation of the rotating shaft;
the processing unit calculating a plurality of rotating angles of the rotating shaft according to the encoded data generated by the angel encoder;
the distance sensor detecting a plurality of relative distances between itself and the first side, the second side, the third side, and the fourth side of the front frame respectively during the rotating shaft makes one rotation;
the processing unit determining whether the rotating shaft makes one rotation according to the encoded data generated by the angle encoder;
the processing unit calculating four local minimum distances according to relationship of the plurality of rotating angles and the plurality of relative distances; and
the touch device positioning the stylus on the touch surface according to the four local minimum distances;
wherein the four local minimum distances are equal to a first minimum distance between the distance sensor and the first side, a second minimum distance between the distance sensor and the second side, a third minimum distance between the distance sensor and the third side, and a fourth minimum distance between the distance sensor and the fourth side respectively.

14. The touch positioning method of claim 13, wherein the processing unit sets one of the relative distances as one of the four local minimum distances when determining that the one of the relative distances is less than a previous relative distance and a next relative distance.

15. The touch positioning method of claim 13, wherein the processing unit calculates a first ratio of the first local minimum distance to a sum of the first local minimum distance and the third local minimum distance and calculates a second ratio of the second local minimum distance to a sum of the second local minimum distance and the fourth local minimum distance according to the four local minimum distances, and the touch device positions the stylus on the touch surface according to the first ratio and the second ratio.

16. The touch positioning method of claim 13 further comprising:
the processing unit actuating the motor to rotate the rotating shaft by an offset angle in an opposite direction in advance before the rotating shaft starts to rotate, so as to make a detection direction of the distance sensor form the offset angle cooperatively with an indication direction of the mark.

* * * * *